United States Patent
Stein et al.

(10) Patent No.: US 10,211,662 B2
(45) Date of Patent: *Feb. 19, 2019

(54) WIRELESS CHARGING PLATFORM USING ENVIRONMENT BASED BEAMFORMING FOR WIRELESS SENSOR NETWORK

(71) Applicant: ANALOG DEVICES TECHNOLOGY, Hamilton (BM)

(72) Inventors: Yosef Stein, Sharon, MA (US); Roman Trogan, Needham, MA (US); Haim Primo, Ganei Tikva (IL)

(73) Assignee: ANALOG DEVICES GLOBAL, Hamilton (BM)

( * ) Notice: Subject to any disclaimer, the term of this patent is extended or adjusted under 35 U.S.C. 154(b) by 1131 days.

This patent is subject to a terminal disclaimer.

(21) Appl. No.: 14/461,003

(22) Filed: Aug. 15, 2014

(65) Prior Publication Data

US 2016/0049824 A1    Feb. 18, 2016

(51) Int. Cl.
*H02J 50/23* (2016.01)
*H02J 7/02* (2016.01)
(Continued)

(52) U.S. Cl.
CPC .............. *H02J 7/025* (2013.01); *H02J 50/20* (2016.02); *H02J 50/23* (2016.02); *H04B 5/0037* (2013.01);
(Continued)

(58) Field of Classification Search
CPC .. H02J 50/20; H02J 50/23; H02J 50/27; H02J 50/40
See application file for complete search history.

(56) References Cited

U.S. PATENT DOCUMENTS 7,872,368 B2   1/2011  Karimi et al.
7,873,326 B2   1/2011  Sadr
(Continued)

FOREIGN PATENT DOCUMENTS

CN    202076853    12/2011
EP      2518863    10/2012
(Continued)

OTHER PUBLICATIONS

Mohammed F. A. Ahmed, "Collaborative Beamforming for Wireless Sensor Network," Thesis submitted to the Faculty of Graduate Studies and Research to University of Alberta, Department of Electrical and Computer Engineering, © Mohammed F. A. Ahmed, Spring 2011, Edmonton, Alberta, 147 pages.
(Continued)

*Primary Examiner* — Fritz M Fleming
(74) *Attorney, Agent, or Firm* — Patent Capital Group

(57) ABSTRACT

A wireless charging network system is disclosed that includes wirelessly charged sensor nodes. The wireless network system can include a gateway node configured to aggregate data from sensor nodes within a coverage area of the gateway node. The gateway node is further configured to wirelessly transmit power to the sensor nodes using a beamformed signal, wherein the gateway node adjusts the beamformed signal to maximize wireless power transfer to sensor nodes within each sector of the coverage area. Location information can be used to adjust the beamformed signal. For example, in various embodiments, the gateway node includes a beamformer sector profile table that defines channel adaptive beam profiles for the beamformed signal for each sector of the coverage area. The gateway node can use location information to define the beam profiles.

19 Claims, 9 Drawing Sheets

(51) Int. Cl.
*H04W 4/70* (2018.01)
*H02J 50/20* (2016.01)
*H04W 16/28* (2009.01)
*H04W 52/04* (2009.01)
*H04B 5/00* (2006.01)
*H04B 7/06* (2006.01)
*H04W 88/16* (2009.01)
*H04W 84/18* (2009.01)
*H04W 64/00* (2009.01)

(52) U.S. Cl.
CPC ............ *H04B 7/0617* (2013.01); *H04W 4/70* (2018.02); *H04W 16/28* (2013.01); *H04W 52/04* (2013.01); *H04W 64/00* (2013.01); *H04W 84/18* (2013.01); *H04W 88/16* (2013.01)

(56) References Cited

U.S. PATENT DOCUMENTS

| | | | |
|---|---|---|---|
| 8,049,360 B2 | 11/2011 | Karimi et al. | |
| 8,120,532 B2 | 2/2012 | Rofougaran | |
| 8,144,066 B2 | 3/2012 | Parsche | |
| 8,260,360 B2 | 9/2012 | Rofougaran et al. | |
| 8,362,745 B2 | 1/2013 | Tinaphong | |
| 8,489,199 B2 | 7/2013 | Rofougaran | |
| 8,547,057 B2 | 10/2013 | Dunworth et al. | |
| 8,558,673 B2 | 10/2013 | Moshfeghi | |
| 8,638,217 B2 | 1/2014 | Arms et al. | |
| 8,693,455 B2 | 4/2014 | Shoarinejad | |
| 2006/0284593 A1* | 12/2006 | Nagy | H02J 7/00 320/109 |
| 2007/0021140 A1* | 1/2007 | Keyes, IV | H02J 17/00 455/522 |
| 2007/0298846 A1 | 12/2007 | Greene et al. | |
| 2008/0014897 A1* | 1/2008 | Cook | H02J 17/00 455/343.1 |
| 2008/0291042 A1 | 11/2008 | Soares, Jr. | |
| 2010/0276995 A1* | 11/2010 | Marzetta | H02J 5/005 307/11 |
| 2011/0151789 A1 | 6/2011 | Viglione et al. | |
| 2011/0281535 A1 | 11/2011 | Low et al. | |
| 2012/0095619 A1* | 4/2012 | Pack | G05D 1/0038 701/2 |
| 2012/0158177 A1* | 6/2012 | Lee | G05D 1/0282 700/248 |
| 2012/0293370 A1 | 11/2012 | Su et al. | |
| 2013/0057388 A1 | 3/2013 | Attanasio | |
| 2013/0137455 A1* | 5/2013 | Xia | H02J 17/00 455/456.1 |
| 2013/0234536 A1 | 9/2013 | Chemishkian et al. | |
| 2013/0241468 A1 | 9/2013 | Moshfeghi | |
| 2013/0241474 A1 | 9/2013 | Moshfeghi | |
| 2014/0011543 A1 | 1/2014 | Li et al. | |
| 2014/0062669 A1 | 3/2014 | Mena et al. | |
| 2014/0062672 A1 | 3/2014 | Gudan et al. | |
| 2014/0080425 A1 | 3/2014 | Rofougaran et al. | |
| 2014/0111032 A1 | 4/2014 | Shearer et al. | |
| 2015/0002080 A1 | 1/2015 | Lang | |
| 2015/0102680 A1* | 4/2015 | Menegoli | H02J 17/00 307/104 |
| 2015/0303741 A1 | 10/2015 | Malik et al. | |
| 2016/0049823 A1 | 2/2016 | Stein | |

FOREIGN PATENT DOCUMENTS

| | | |
|---|---|---|
| EP | 2590335 | 5/2013 |
| EP | 2725519 | 4/2014 |
| WO | 2013/105920 | 7/2013 |
| WO | 2013/151993 | 10/2013 |

OTHER PUBLICATIONS

Gubong Lim et al., "Energy Efficiency of Cooperative Beamforming in Wireless Ad-Hoc Networks," IEEE ICC 2012—Wireless Communications Symposium, 978-1-4577-2053-6/12/$31.00 © 2012 IEEE, 5 pages (4039-4043).

Liang Liu et al., "Multi-Antenna Wireless Powered Communication with Energy Beamforming," arXiv:1312.1450v3 [cs.IT] Apr. 15, 2014, 25 pages.

Non-Final Office Action (OA1) issued in U.S. Appl. No. 14/460,913 dated Mar. 27, 2017, 9 pages.

Restriction Requirement issued in U.S. Appl. No. 14/460,913 dated Nov. 3, 2016, 8 pages.

CN Patent Application Serial No. 201510498401.9 filed Aug. 14, 2015.

EP Patent Application Serial No. 15179586.1 filed Aug. 3, 2015.

European Search Report issued in EP Serial No. 15179586.1 dated Nov. 17, 2015, 10 pages.

Office Action (OA1) issued in CN Patent Application Serial No. 201510498401.9 dated May 26, 2017, 12 pages [EN Summary only].

\* cited by examiner

WIRELESS CHARGING PLATFORM USING ENVIRONMENT BASED BEAMFORMING FOR WIRELESS SENSOR NETWORK

TECHNICAL FIELD

The present disclosure relates generally to wireless network environments, and more particularly, to wireless charging in wireless network environments.

BACKGROUND

Radio frequency (RF) system and wireless sensor network (WSN) are two technologies integrated to provide a wide variety of applications, particularly where merging the physical world with the digital world (also referred to as the virtual world). For example, where energy-constraints confine network performance of a wireless sensor network, RF energy harvesting schemes can be implemented to provide power (energy) to various nodes of the wireless sensor network, while further extending sensing capabilities of the wireless sensor network. In such scenarios, wireless power is efficiently and optimally transmitted to the various nodes. Although existing wireless power transmission systems and methods in wireless network environments have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

A wireless charging platform for a wireless sensor network and associated wireless charging method are disclosed herein. In various embodiments, a wireless charging network system is disclosed that includes wirelessly charged sensor nodes. The wireless network system can include a gateway node configured to aggregate data from sensor nodes within a coverage area of the gateway node. The gateway node is further configured to wirelessly transmit power to the sensor nodes using a beamformed signal, wherein the gateway node adjusts the beamformed signal to maximize wireless power transfer to sensor nodes within each sector of the coverage area. In some embodiments, wireless network system is configured as a radio frequency identification (RFID) system, wherein the gateway node is an RFID reader and the sensor nodes include RFID tags. Location information can be used to adjust the beamformed signal. For example, in various embodiments, the gateway node includes a beamformer sector profile table that defines channel adaptive beam profiles for the beamformed signal for each sector of the coverage area. The gateway node can use location information to define the beam profiles. Wireless charging network system may be a global positioning system (GPS) denied environment. In some embodiments, the sensor nodes include inertial measurement units (IMUs), and the gateway node is configured to receive the location information from the IMUs.

The gateway node can further include an Internet of Things (IoT) interface connected to an IoT network, wherein the gateway node is configured to receive the location information over the IoT network via the IoT interface. In some embodiments, the sensor nodes include inertial measurement units IMUs, and the gateway node receives the location information from a network element over the IoT network, wherein the network element includes knowledge of positional data obtained by the IMUs. In some embodiments, the sensor nodes include robots that have IMUs, and the gateway node receives the location information from a robot communications network via IoT connectivity. In some embodiments, the gateway node is configured to receive the location information from a robot communications network. In some embodiments, gateway node can update the beamformer sector profile table based on communications between robots.

DETAILED DESCRIPTION OF EXAMPLE EMBODIMENTS

Figure 1:
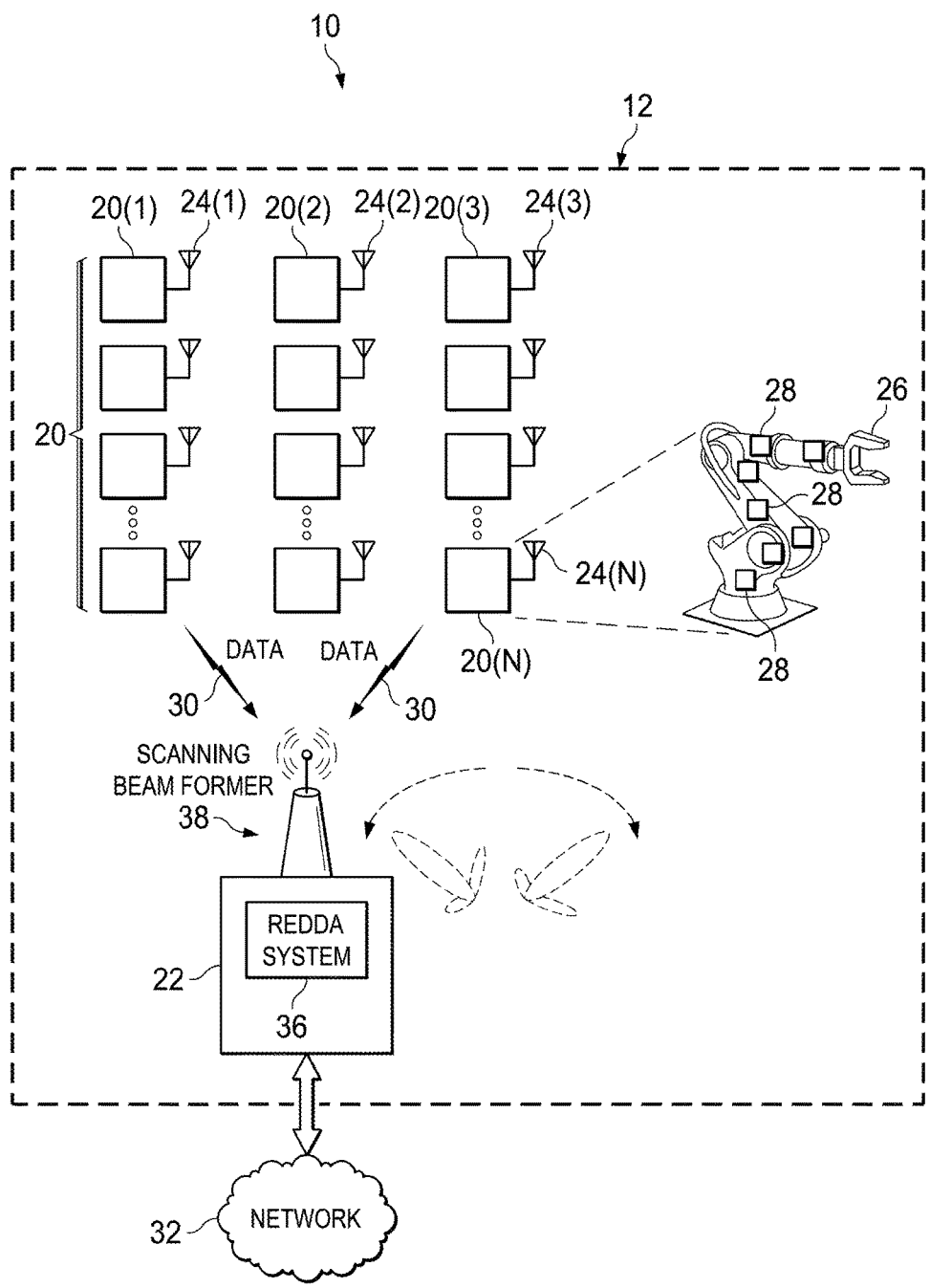
FIG. 1 is a schematic block diagram of an exemplary communications system for optimizing wireless power transmission in a network environment according to various aspects of the present disclosure.

Radio frequency (RF) system and wireless sensor network (WSN) are two technologies integrated to provide a wide variety of applications, particularly where merging the physical world with the digital world (also referred to as the virtual world). FIG. 1 is a schematic block diagram of an exemplary communications system 10 for optimizing wireless charging (also referred to as wireless power transmission) in a network environment according to various aspects of the present disclosure. FIG. 1 has been simplified for the sake of clarity to better understand the inventive concepts of the present disclosure. Additional features can be added in communications system 10, and some of the features described can be replaced or eliminated in other embodiments of communications system 10.

In FIG. 1, communications system 10 includes a wireless network system 12, such as a wireless sensor network. Wireless network system 12 includes sensor nodes 20 that communicate wirelessly with a gateway node 22. Each sensor node 20 can collect data from its surrounding environment (e.g., wireless network system 12) and communicate the collected data via data signals to gateway node 22 for further processing. Any number of sensor nodes 20, and in some embodiments any number of gateway nodes 22, can be provided within wireless network system 12. In various embodiments, wireless network system 12 can include hundreds or even thousands of sensor nodes 20, where at least one gateway node 22 is used to communicate with the sensor nodes 20. For purposes of the following discussion, and in various embodiments, wireless network system 12 represents a radio frequency identification (RFID) system, where sensor nodes 20 include RFID tags that store data, and gateway node 22 includes an RFID reader that communicates wirelessly with the RFID tags to collect data from and charge (power) the RFID tags. In various embodiments, sensor nodes 20 can be distributed throughout a location, for example, within and/or around a building, such as a warehouse, where gateway node 22 can track information associated with the building or objects, people, animals, and/or entities (collectively referred to as things) associated with the building. In various embodiments, sensor nodes 20 and gateway node 22 wirelessly communicate using any appropriate communication standard, including Wi-Fi (for example, IEEE 802.11), Bluetooth, an IEEE 802.15.x communication standard (such as SmartGrid IEEE 802.15.4g and/or WBAN IEEE 802.15.6g), other appropriate communication standard, and/or variations thereof.

Sensor nodes 20 can include sensor nodes 20(1), 20(2), 20(3), . . . , 20(N) having associated antennas 24(1), 24(2), 24(3), . . . , 24(N), where N is a total number of sensor nodes 20 in wireless network system 12. Each sensor node 20 can include a sensing unit, a processor, an RF transceiver, and an energy source (also referred to as a power source). Depending on applications of wireless network system 12, sensor nodes 20 may have identical or varying sensing, processing, transmitting, receiving, and/or powering capabilities. The sensing unit includes one or more sensors, such as optical, magnetic, mechanical, thermal, biological, chemical, visual, infrared, and/or other type of sensors for monitoring various parameters within or around wireless network system 12. In various embodiments, each sensor node 20 can represent a robot. For example, sensor node 20(N) includes a robot 26 having various sensors 28 (seven sensors in the depicted embodiment), where gateway node 22 can wirelessly collect data from each sensor 28. The power source of sensor nodes 20 can be an internal power source, such as a battery internal to sensor nodes 20 (for example, where sensor nodes 20 include an active RFID tag), an external power source, such as RF energy received from gateway node 22 (for example, where sensor nodes 20 include a passive RFID tag), or a combination thereof (for example, where sensor nodes 20 include a semi-passive RFID tag). In various embodiments, as described further below, sensor nodes 20 wirelessly derive at least a portion of power from gateway node 22, particularly from energy, such as RF energy, from gateway node 22. In various embodiments, each sensor node 20 includes an energy harvesting mechanism for deriving, capturing, and storing energy from external sources (for example, RF energy from gateway node 22). In some embodiments, sensor nodes 20 operate solely off RF energy harvested from gateway node 22.

As noted, gateway node 22 can aggregate data collected by sensor nodes 20. In various embodiments, gateway node 22 receives data signals 30 from sensor nodes 20 (including from each sensor 28 of sensor nodes 20), which include information about the surrounding environment of each sensor node 20. Gateway node 22 can communicate the collected data to network elements of wireless network system 12 or to network elements over a network 32. In various embodiments, gateway node 22 communicates with a host computer system and/or host database within wireless network system 12 or with host computer system and/or host database over network 32, which can communicate with an application for processing information collected from sensor nodes 20. Alternatively, in various embodiments, gateway node 22 can communicate directly with an application over network 32. As used herein, the term "network element" can encompass computers, network appliances, servers, routers, switches, gateways, bridges, load balancers, firewalls, processors, modules, or any other suitable device, component, element, or object operable to exchange information in a network environment, such as communication system 10. Moreover, the network elements may include any suitable hardware, software, components, modules, interfaces, or objects that facilitate the operations thereof. This may be inclusive of appropriate algorithms and communication protocols that allow for the effective exchange of data or information.

In various embodiments, communication system 10 represents an Internet of Things (IoT) system, where things (for example, objects, people, animals, and/or entities) and sensors within or attached to these things are connected to the Internet. The things can be connected to the Internet via wireless and/or wired connections. For example, in various embodiments, network 32 is the Internet, and gateway node 22 includes an IoT interface that connects gateway node 22 to network 32, such that information collected by sensor nodes 20 can be communicated to network elements and/or applications over the Internet. In various embodiments, gateway node 22 wirelessly communicates with network elements and/or applications over the Internet. In such embodiments, wireless network system 12 can serve as a backhaul network, and in some embodiments, where wireless network system 12 includes a host computer system connected to gateway node 22, the host computer system can serve as a backhaul computer. Furthermore, communication system 10 may be configured over a physical infrastructure that includes one or more networks and, further, can be configured in any form including, but not limited to, local area networks (LANs), wireless local area networks (WLANs), virtual local area networks (VLANs), metropolitan area networks (MANs), wide area networks (WANs), virtual private networks (VPNs), Internet, Intranet, Extranet, any other appropriate architecture or system, or any combination thereof that facilitates communications as described herein. In some embodiments, communication links may represent any electronic link supporting a LAN environment such as, for example, cable, Ethernet, wireless technologies (for example, IEEE 802.11x), ATM, fiber optics, or any suitable combination thereof. In other embodiments, communication links may represent a remote connection through any appropriate medium (such as digital subscriber lines, telephone lines, T1 lines, T3 lines, wireless, satellite, fiber optics, cable, Ethernet, etc. or any combination thereof) and/or through any additional networks.

As further noted, gateway node 22 can wirelessly charge sensor nodes 20, for example, by wirelessly transmitting power to sensor nodes 20. In the depicted embodiment, gateway node 22 includes a radio frequency energy distributor and data aggregator (REDDA) system 36 that aggregates data from sensor nodes 20 and wirelessly transmits power to sensor nodes 20 using a beamformed signal 38, such that sensor nodes 20 can operate using energy harvested from beamformed signal 38. In various embodiments, REDDA system 36 aggregates data from sensor nodes 20 and wirelessly transmits power to sensor nodes 20 on different radio bands, such as different ISM radio bands. For example, REDDA system 36 receives data signals 30 from sensor nodes 20 on a narrowband radio, and wirelessly transmits power via beamformed signal 38 to sensor nodes 20 on a wideband radio. Using different radio bands for aggregating and transmitting can prevent (or minimize) collision of data signals 30 and/or beamformed signal 38 and/or minimize data retransmission. In various embodiments, REDDA system 36 can include a wideband aggregator receiver, and sensor node 20 can include a sensor narrowband radio, where REDDA system 36 can aggregate data from the sensor narrowband radio using the wideband aggregator receiver in a manner that avoids data collision and minimizes data retransmission. In various embodiments, REDDA system 36 can scan in a frequency ISM band ranging from about 902 MHz to about 928 MHz (an unlicensed frequency ISM band for North America). Within this frequency band, REDDA system 36 can allocate about 10 MHz for wirelessly transmitting power, and about 16 MHz for aggregating data. In various embodiments, sensor nodes 20 can be configured with narrowband modulators (for example, IEEE 802.15.4g narrowband modulators) using a frequency band having a bandwidth that ranges from about 50 KHz to about 200 KHz for transmitting data.

Figure 2A:
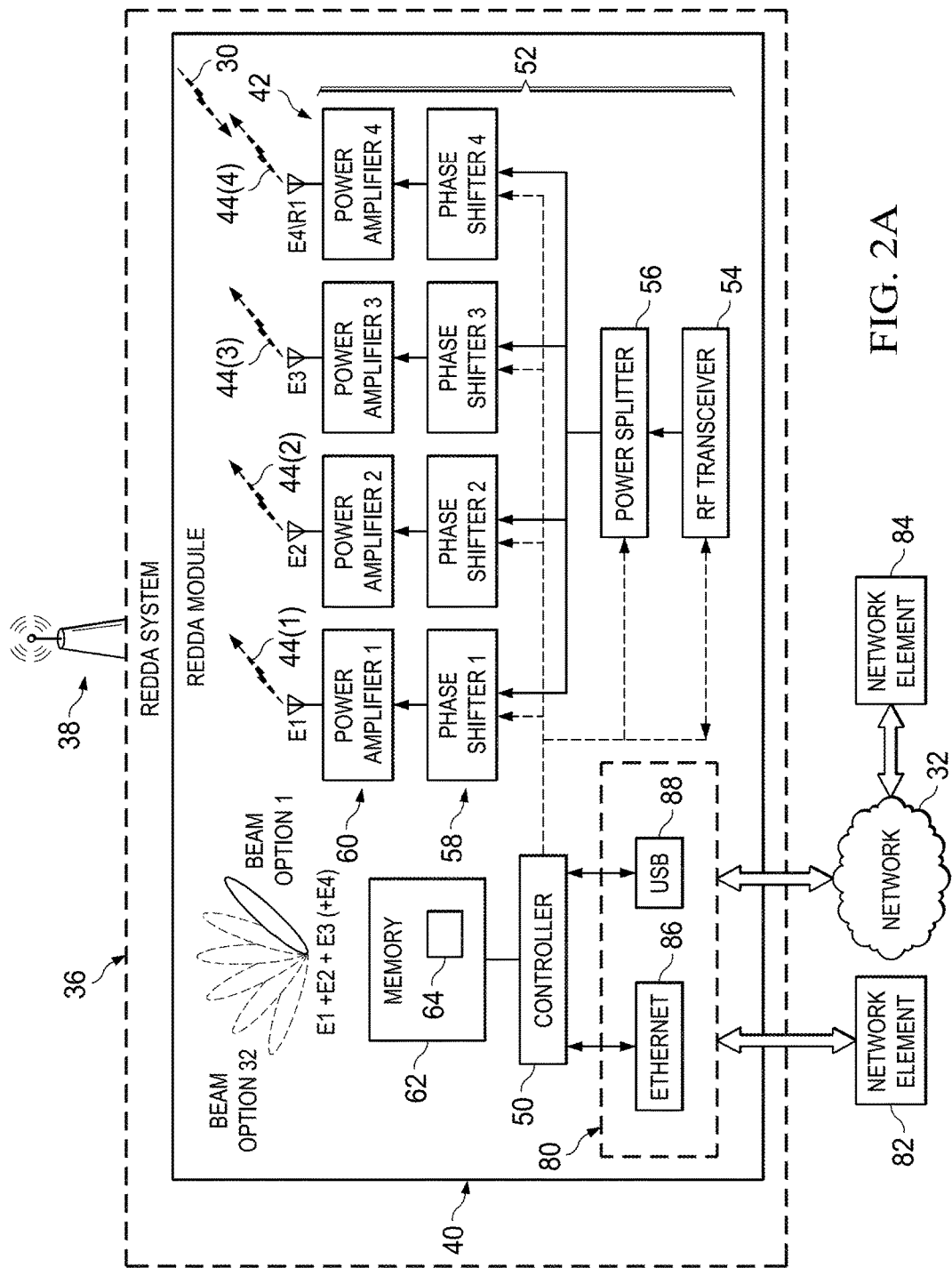
FIG. 2A, FIG. 2B, and FIG. 2C are schematic block diagrams of an exemplary gateway node that uses beamforming mechanisms for transmitting wireless power in a network environment according to various aspects of the present disclosure.
Figure 2B:
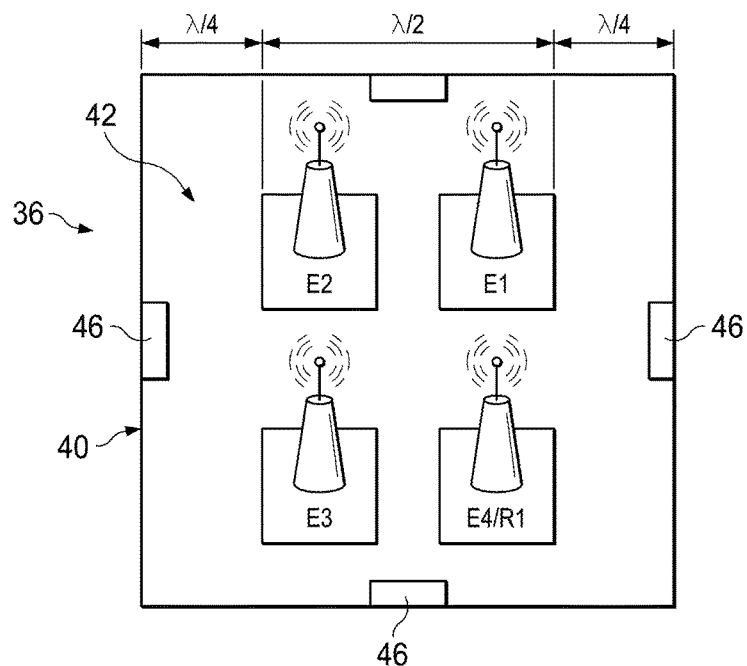
Figure 2C:
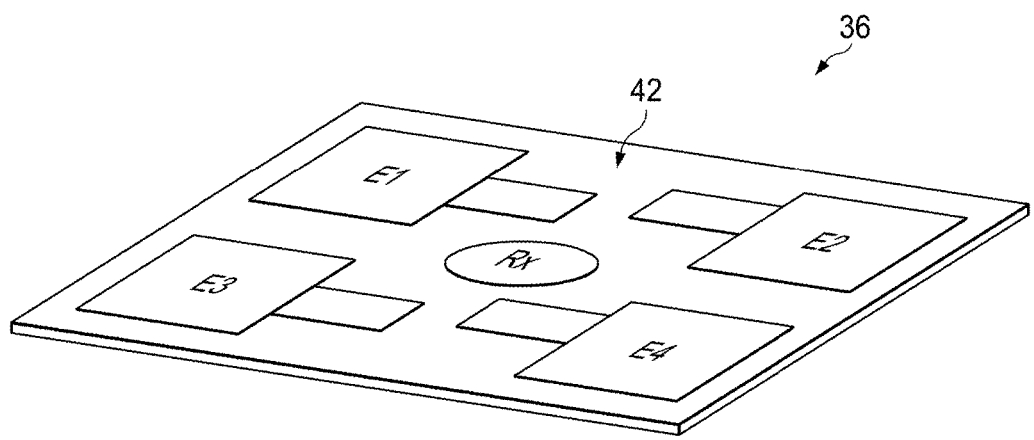

FIG. 2A, FIG. 2B, and FIG. 2C are schematic block diagrams of an exemplary REDDA system 36, which can be implemented in gateway node 22, according to various aspects of the present disclosure. REDDA system 36 can be implemented using distributed various integrated circuits and/or devices interconnected with each other, such that components of REDDA system 36 are integrated to provide the functions described herein. FIG. 2A, FIG. 2B, and FIG. 2C have been simplified for the sake of clarity to better understand the inventive concepts of the present disclosure. Additional features can be added in REDDA system 36, and some of the features described can be replaced or eliminated in other embodiments of REDDA system 36.

REDDA system 36 includes a REDDA module 40 that aggregates data signals 30 from sensor nodes 20 and produces beamformed signal 38 for wirelessly charging sensor nodes 20. For example, REDDA module 40 includes an antenna array 42 having multiple antennas (elements) E1, E2, E3, and E4 that transmit associated RF signals 44(1), 44(2), 44(3), and 44(4) (collectively referred to as RF signals 44) to achieve various radiation patterns for beamformed signal 38. As described in detail below, REDDA module 40 uses different radiation patterns for beamformed signal 38 to optimize wireless power transmission. In FIG. 2A and FIG. 2B, REDDA module 40 includes an antenna that both receives and transmits RF signals, such as antenna E4/R1 that both receives data signals 30 and transmits associated RF signal 44(4). Alternatively, as depicted in FIG. 2C, in some embodiments, REDDA module 40 can include a separate antenna, such as antenna RX, for receiving data signals 30. In various implementations, REDDA module 40 includes a single antenna for receiving data signals 30 to collect information from sensor nodes 20. Alternatively, REDDA module 40 can include more than one antenna for receiving data signals 30.

Figure 3:
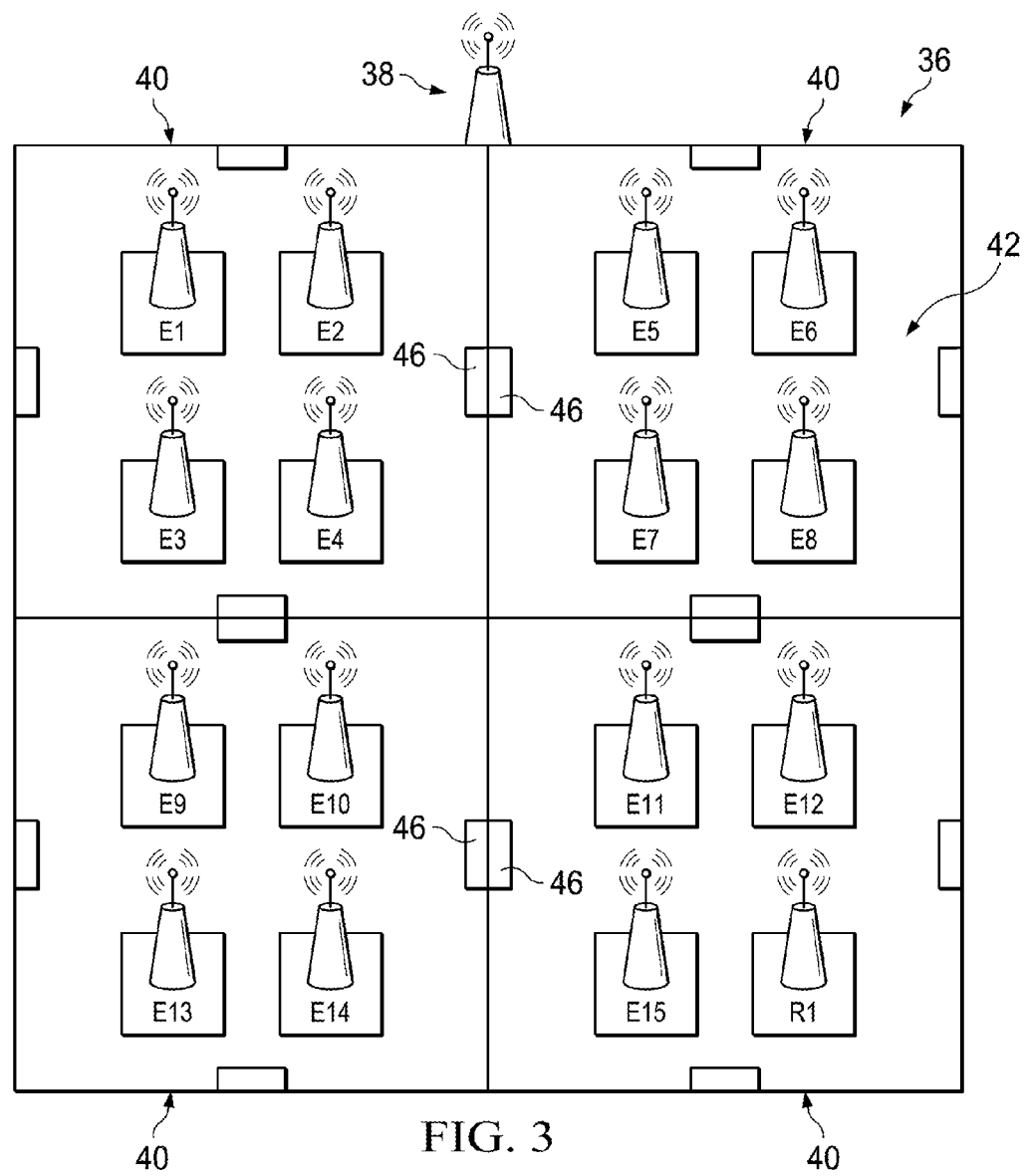
FIG. 3 is a schematic block diagram of an exemplary antenna array for wirelessly transmitting power that can be implemented in a gateway node, such as the gateway node illustrated in FIGS. 2A-2C, according to various aspects of the present disclosure.

In various embodiments, antenna array 42 can include a linear array, a circular array, a planar array, a conformal array, or other type of array. In FIGS. 2A-2C, antenna array 42 includes a two-dimensional antenna array, such as a 2×2 planar antenna array, for transmitting beamformed signal 38. Alternatively, antenna array 42 can have other dimensions, for example, a 2×4 planar antenna array, a 4×4 planar antenna array, or other dimension depending on design considerations of REDDA system 36 and/or REDDA module 40. REDDA module 40 includes at least one communication port 46 for connecting to other REDDA modules, such that REDDA system 36 has a fully configurable antenna array. Such configurability facilitates various antenna array configurations, providing great flexibility in achieving various radiation patterns depending on design considerations of wireless network system 12, sensor nodes 20, and/or REDDA system 36. FIG. 3 is a schematic block diagram of an exemplary REDDA system 36 that includes multiple REDDA modules 40, which can be implemented in gateway node 22, according to various aspects of the present disclosure. For example, REDDA system 36 includes four REDDA modules 40 interconnected via communication ports 46, providing a 4×4 planar antenna array 42 that includes antennas (elements) E1, E2, E3, E4, E5, E6, E7, E8, E9, E10, E11, E12, E13, E14, and E15 for transmitting associated RF signals to provide beamformed signal 38. A receiving antenna R1 is also provided for receiving data signals 30 from sensor nodes 20. In various embodiments, receiving antenna R1 can also transmit an associated RF signal to provide beamformed signal 38. FIG. 3 has been simplified for the sake of clarity to better understand the inventive concepts of the present disclosure. Additional features can be added in REDDA system 36, and some of the features described can be replaced or eliminated in other embodiments of REDDA system 36.

Returning to FIGS. 2A-2C, REDDA module 40 is configured such that antenna array 42 is an electronically steered antenna array (for example, by varying signal phases of each antenna within antenna array 42), which can achieve various radiation patterns for beamformed signal 38. REDDA module 40 includes a controller 50 that controls data signal processing and wireless power transmitting of antenna array 42. In various embodiments, controller 50 is programmable digital logic, such as a field programmable gate array (FPGA). Alternatively, controller 50 can be implemented as another programmable logic device, a processor, an application specific integrated circuit (ASIC), a digital signal processor (DSP), a microcontroller, a microprocessor, a processing module, other suitable controller, or a combination thereof. Controller 50 implements beamforming to achieve various radiation patterns for beamformed signal 38. Generally, beamforming involves combining RF signals 44 associated with antennas of the antenna array 42 in a way that some RF signals experience constructive interference, while other RF signals experience destructive interference. In various embodiments, controller 50 adjusts various antenna array parameters of antenna array 42 to achieve various radiation patterns for beamformed signal 38, including generally array shape (linear, circular, planar, or other array shape depending on a desired radiation pattern), antenna spacing, antenna excitation coefficients (for example, excitation amplitude and/or excitation phase), pattern of antennas in the antenna array, and/or other antenna array parameters.

For example, an array factor (AF) associated with antenna array 42 can be varied to achieve different radiation patterns. The array factor depends on geometry of antenna array 42 and excitation coefficients (e.g., amplitude and/or phase) associated with antennas of antenna array 42. In various embodiments, an array factor ($AF_{x1}=S_{X_M}$) for a linear array of M antennas along an x-axis of antenna array 42 can be represented by the following equation:

$$S_{X_M} = AF_{x1} = \sum_{m=1}^{M} I_{m1} e^{j(m-1)(kd_x \sin\theta\cos\phi + \beta_x)}$$

where $I_{m1}$ (m=1, . . . , M) is an excitation amplitude of an antenna of antenna array 42 at a point represented by x=(m−1)$d_x$; $d_x$ is a distance between antennas of antenna array 42 in an x-direction (for simplicity, assume antennas of antenna array 42 are equispaced); $\beta_x$ represents a progressive phase shift (a phase shift between adjacent antennas of antenna array 42 in the x-direction); and sin θ cos φ is a directional cosine with respect to the x-axis. Similarly, if N such linear arrays are situated along a y-axis of antenna array 42 (thereby forming a rectangular array), an array factor ($AF_{y1}=S_{Y_N}$) along the y-axis of antenna array 42 can be represented by the following equation:

$$S_{Y_N} = AF_{y1} = \sum_{n=1}^{N} I_{n1} e^{j(n-1)(kd_y \sin\theta\sin\phi + \beta_y)}$$

where $I_{n1}$ (n=1, . . . , N) is an excitation amplitude of an antenna of antenna array 42 at a point represented by y=(n−1)$d_y$; $d_y$ is a distance between antennas of antenna array 42 in a y-direction (for simplicity, assume antennas of antenna array 42 are equispaced); $\beta_y$ represents a progressive phase shift (a phase shift between adjacent antennas of antenna array 42 in the y-direction); and sin θ sin φ is a directional cosine with respect to the y-axis. Then, the array factor for the entire antenna array 42 can be represented by the following equation:

$$AF = S_{X_M} S_{Y_N} =$$

$$AF_{y1} = \sum_{n=1}^{N} I_{n1} \left[ \sum_{m=1}^{M} I_{m1} e^{j(m-1)(kd_x\sin\theta\cos\phi+\beta_x)} \right] e^{j(n-1)(kd_y\sin\theta\sin\phi+\beta_y)}$$

where a shape of the array factor for antenna array 42 can be controlled by the following parameters: extinction coefficients of each antenna element (for example, $I_{n1}$, $I_{m1}$), distance between antennas (for example, $d_x$ and $d_y$), and progressive phase shift between antennas (for example, $\beta_x$ and $\beta_y$).

Figure 4A:
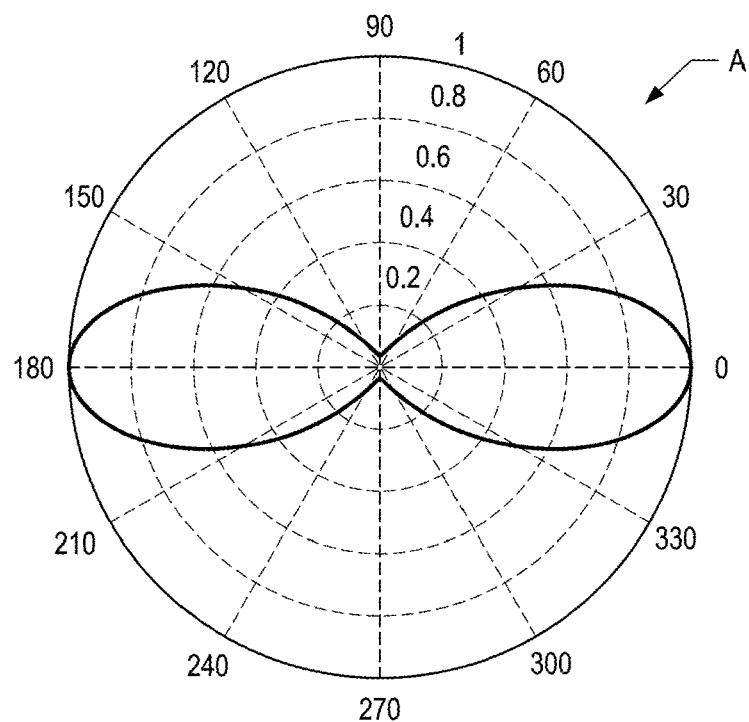
FIG. 4A, FIG. 4B, FIG. 4C, and FIG. 4D illustrate array factors that can be achieved by a gateway node, such as the gateway node illustrated in FIGS. 2A-2C, to vary a radiation pattern of a beamformed signal for transmitting wireless power according to various aspects of the present disclosure.
Figure 4B:
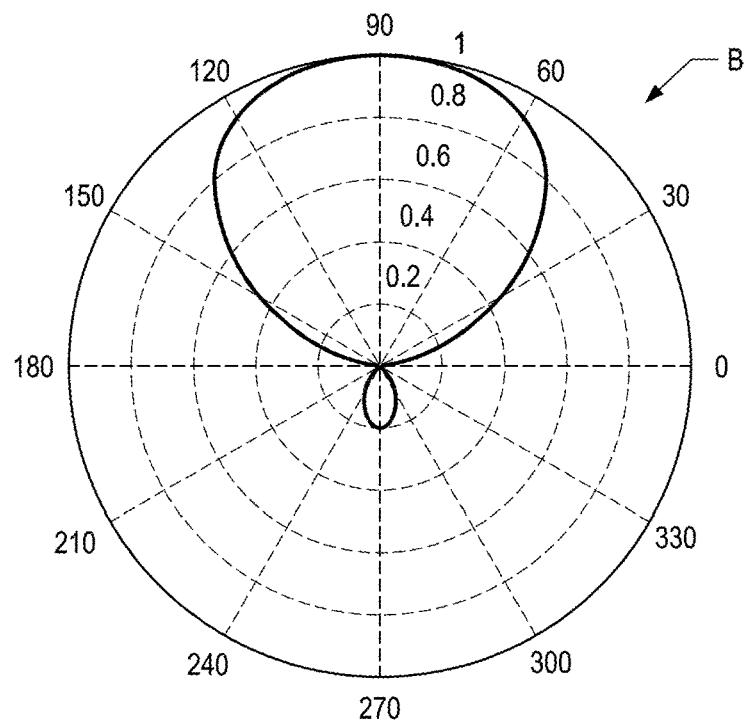
Figure 4C:
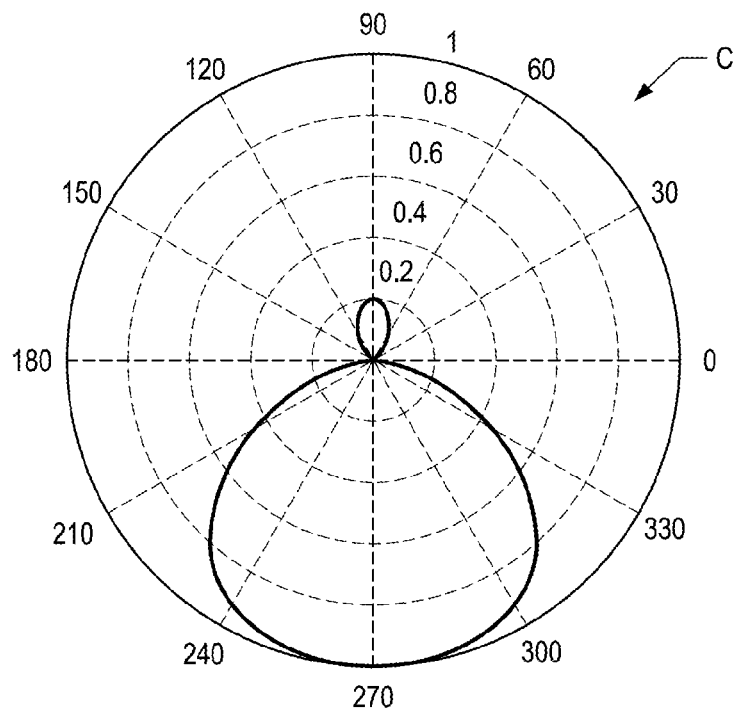
Figure 4D:
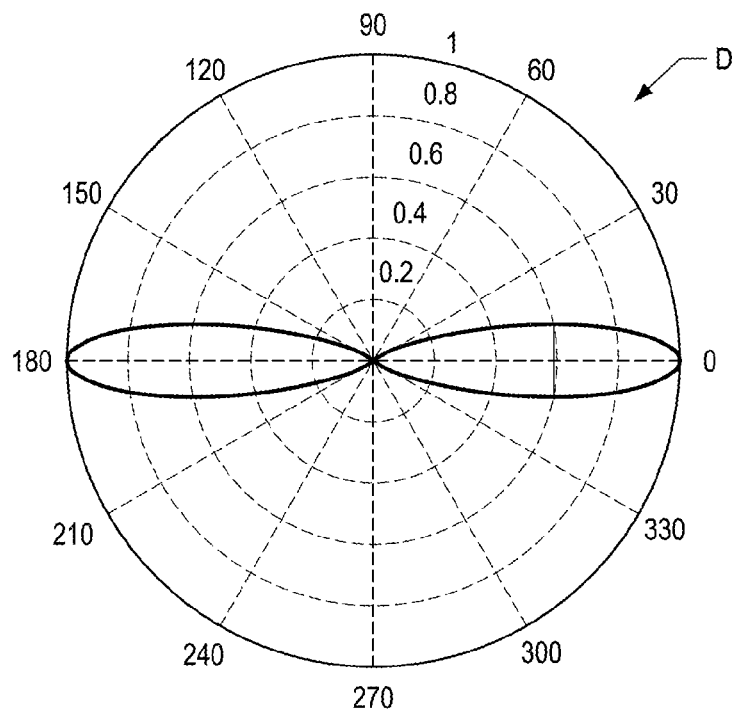

FIG. 4A, FIG. 4B, FIG. 4C, and FIG. 4D illustrate array factors that can be achieved by varying antenna array parameters (such as number of antennas and/or progressive phase shifts), and thereby achieve different radiation patterns for beamformed signal 38, according to various aspects of the present disclosure. Each array factor is plotted as a two-dimensional representation as a function of angle θ and a constant angle φ (such as 45 degrees). A two-by-two antenna array with a 0 degree progressive phase shift can be represented by array factor A (FIG. 4A), a 225 degree progressive phase shift can be represented by array factor B (FIG. 4B), and a 135 degree phase shift can be represented by array factor C (FIG. 4C). In various embodiments, adjusting the phase shift of the two-by-two antenna can change a shape of the array factor to concentrate radiated energy at different locations, for example, different locations within and/or around wireless network system 12. A four-by-four antenna array with a 0 degree progressive phase shift can be represented by array factor D (FIG. 4D). In various embodiments, a shape of array factor D (arising from the four-by-four antenna array) can concentrate radiated energy at larger distances than a shape of array factor A (arising from the two-by-two antenna array). FIGS. 4A-4D have been simplified for the sake of clarity to better understand the inventive concepts of the present disclosure.

Returning to FIGS. 2A-2C, REDDA module 40 further includes a beamformer mechanism 52 for producing beamformed signal 38, which can include controller 50, an RF transceiver 54 (in various embodiments, an agile wideband RF transceiver), a power splitter 56, and a phase shifter and a power amplifier associated with each antenna E1, E2, E3, and E4 (phase shifters 58 and power amplifiers 60). Controller 50 communicates with RF transceiver 54, power splitter 56, phase shifters 58, and power amplifiers 60 to achieve various radiation patterns for beamformed signal 38. For example, controller 50 can provide a signal to RF transceiver 54, which processes the signal to provide an RF input signal to power splitter 56, which can split (or divide) the RF input signal into various RF signal components (here, four RF signal components). In various embodiments, a processing stage associated with each antenna E1, E2, E3, and E4 of antenna array 42 receives an RF signal component from power splitter 56. In the depicted embodiment, each phase shifter 58 receives a corresponding RF signal component from power splitter 56 (indicated by solid arrows) and a corresponding phase shift component from controller 50 (indicated by dashed arrows) (for example, a programmed, specific phase shift for each antenna of antenna array 42). Each phase shifter 58 can introduce its corresponding phase shift component into its corresponding RF signal component to produce phase-shifted transmit signal components, which are provided to power amplifiers 60. Each antenna E1, E2, E3, and/or E4 can transmit (radiate) respective RF signals 44(1), 44(2), 44(3), and 44(4) responsive to its corresponding amplified, phase-shifted transmit signal component, which combine to produce beamformed signal 38.

Controller 50 can adjust extinction coefficients and progressive phase shifts associated with antenna array 42, such that RF signals 44 associated with antennas E1, E2, E3, and E4 combine to optimize beamformed signal 38. In various embodiments, controller 50 adjusts various array parameters to achieve one of thirty-two beam options (Beam Option 1, Beam Option 2, . . . Beam Option 32). By adjusting various antenna parameters (such as the extinction coefficients and the progressive phase shifts), REDDA system 36 can selectively charge and/or power on/off sensor nodes 20. For example, where a sensor node 20 has a battery (for example, where sensor node 20 includes an active or semi-passive RFID tag), REDDA system 36 can provide beamformed signal 38 with a radiation pattern that selectively charges the battery, in some embodiments, to lengthen a lifetime of the battery. The radiation pattern can be adjusted to maximize wireless charging of the battery and optimize a rate of transfer of RF energy to the sensor node 20. In another example, where a sensor node 20 is battery free (for example, where sensor node 20 includes a passive RFID tag), REDDA system 36 can provide beamformed signal 38 with a radiation pattern that selectively turns on/off the sensor node 20. In some embodiments, the radiation pattern can be adjusted to turn some sensor nodes 20 on while turning other sensor nodes 20 off. The radiation pattern can further be adjusted to maximize wireless power transmission to the sensor nodes 20 to optimize charging and/or powering on time for sensor nodes 20.

In various embodiments, adjusting various antenna parameters to provide beamformed signal 38 with various radiation patterns provides a programmable quality of service (QoS) metric for wireless power transmission. For example, controller 50 can adjust extinction coefficients and progressive phase shifts associated with antenna array 42 to produce radiation patterns for beamformed signal 38 having different QoS. QoS can refer to a defined level of performance in wireless network system 12 and/or communication system 10. Different radiation patterns of beamformed signal 38 can achieve different QoS, depending on communication requirements of communication system 10, wireless network system 12, sensor nodes 20, gateway node 22, REDDA system 36, and/or REDDA module 40. In various embodiments, sensor nodes 20 located in one portion of wireless sensor network 12 may need to receive RF energy with a different QoS than sensor nodes 20 located in another part of wireless sensor network 12. In various embodiments, wireless sensor network 12 can be configured for machine health monitoring. In such configurations, a machine may send an alert to gateway node 22 that indicates a problem associated with the machine (for example, the machine may need more power and/or increase data transmission frequency). Gateway node 22 can produce a radiation pattern that elevates (increases) QoS of the beamformed signal 38 received by the machine, such that the machine receives more power and/or gateway node 22 scans the machine more frequently to increase data transmission frequency. Such QoS can remain elevated until resolving the problem associated with the machine. In various embodiments, the machine can communicated with gateway node 22 over an IoT port, such as that described below, where the machine can report the problem to the gateway node 22, and notify gateway node 22 when the problem has been resolved.

In various embodiments, REDDA module 40 can maximize wireless power transmission based on changes in network environment of wireless network system 20, such as changes in location of sensor nodes 20, gateway node 20, and/or things within and/or around wireless network system 12. For example, REDDA system 36 can evaluate its surrounding network environment to determine an appropriate radiation pattern for beamformed signal 38 that maximizes wireless power transmission, and thus maximizes wireless charging of sensor nodes 20. Different environment parameters can be evaluated based on information collected from sensor nodes 20, network elements within and/or around wireless network system 12, and/or network elements over network 32. In various embodiments, REDDA module 40 can use a programmable beamformer sector profile table to maximize wireless power transmission (for example, maximize RF energy transfer efficiency) to sensor nodes 20. For example, REDDA module 40 can include a memory 62 that stores a beamformer sector profile table 64 that defines various beam profiles for beamformed signal 38, where each beam profile maximizes wireless power transmission for a given environment associated with sensor nodes 20. In various embodiments, each beam profile defines a radiation pattern for beamformed signal 38, along with array parameters that can be implemented to achieve the defined radiation pattern. Each beam profile can further define various network and/or system characteristics that benefit from the beam profiles, such as number/location of sensor nodes 20, type of sensor nodes 20, number/location of other objects or things situated near sensor nodes 20, characteristics of wireless network system 12, characteristics of communication system 10, characteristics of sensor nodes 20 and/or gateway node 22, and/or other environmental characteristics that may affect transmission of beamformed signal 38 to the sensor nodes 20. Controller 50 can select a beam profile from the beamformer sector profile table 64 to maximize wireless power transmission within a given area of wireless network system 12 and/or within a coverage area of gateway node 22. It is noted that beamformer sector profile table 64 can be stored in any form, not necessarily tabular form.

Figure 5:
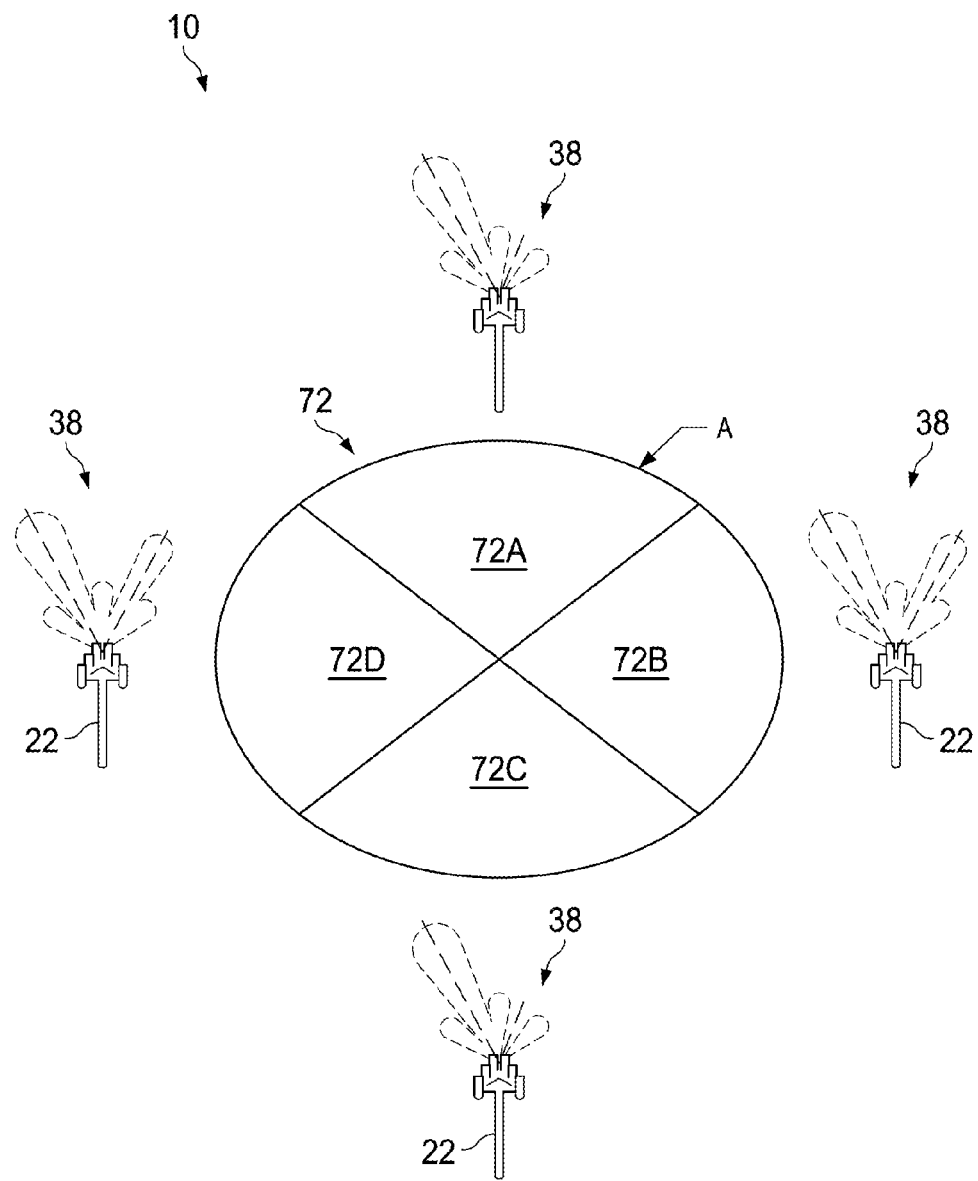
FIG. 5 is a schematic diagram of an exemplary beamformer sector profile table that can be implemented by a gateway node for transmitting wireless power, such as the gateway node illustrated in FIGS. 2A-2C, to maximize wireless power transmission according to various aspects of the present disclosure.

FIG. 5 is a schematic diagram of an exemplary gateway node 22 that uses a programmable beamformer sector profile table to maximize wireless power transmission in different areas according to various aspects of the present disclosure. In FIG. 5, gateway node 22 has a coverage area A, where gateway node 22 aggregates data from and wirelessly transmits power to sensor nodes 20 within coverage area A. In various embodiments, coverage area A is divided into sectors 72, such as a sector 72A, a sector 72B, a sector 72C, and a sector 72D. Sectors 72 can have various dimensions and/or configurations depending on design considerations for wireless network system 12, sensor nodes 20, and/or gateway node 22. For each sector 72, gateway node 22 (for example, REDDA system 36) can define a beam profile, and thus a given radiation pattern, for beamformed signal 38 based on various characteristics of the sector, such as number/location of sensor nodes 20, type of sensor nodes 20, reflection characteristics of surrounding environment of sensor nodes 20 and/or gateway node 22, and/or other characteristics associated with each sector 72, such as objects or things that may interfere with sensor nodes 20 receiving beamformed signal 38. The defined beam profiles can be stored in beamformer sector profile table 74. For example, in FIG. 5, beamformed signal 38 has a different beam profile (radiation pattern) in sector 72A, sector 72B, sector 72C, and sector 72D, such that beamformed signal 38 maximizes wireless transmission (such as RF energy transfer efficiency) to sensor nodes 20 in sector 72A, sector 72B, sector 72C, and sector 72D. In various embodiments, where a sector has too much reflection, a radiation pattern of beamformed signal 38 can be adjusted to boost wireless energy transfer within the sector. FIG. 5 has been simplified for the sake of clarity to better understand the inventive concepts of the present disclosure. Additional features can be added, and some of the features described can be replaced or eliminated in other embodiments.

Turning again to FIGS. 2A-2C, as noted above, gateway node 22 can communicate the collected data to network elements of wireless network system 12 or to network elements over network 32. In FIG. 2A, REDDA module 40 can also include an interface 80 that connects REDDA module 40 to network elements within wireless network system 12, such as a network element 82, or to network elements over network 32, such as network element 84. In some embodiments, network element 82 can be connected to network 32. Interface 80 can include an Ethernet interface 86 and/or a universal serial bus (USB) interface 86 for connecting to other networks, network elements, and/or applications. In various embodiments, interface 80 is an IoT interface that connects REDDA module 40 to an IoT system through a wired and/or wireless connection. For example, REDDA module 40 can be connected to the Internet. In various embodiments, network element 82 and/or network element 84 can be implemented as a host computer system that processes information collected from sensor nodes 20 via REDDA module 20. In various embodiments, gateway node 22 can directly communicate with the Internet and/or Internet connected entities and/or with other networks and/or network connected entities (such as a robot network, as described further below) via the IoT interface. In various embodiments, the IoT interface facilitates building a mesh network out of more than one REDDA system 36, where the REDDA systems 36 can communicate with one another and data mine over wireless network system 12. In some embodiments, REDDA system 36 can data mine over wireless network system 12 via the IoT interface to better define an appropriate radiation pattern for beamformed signal 38. In some situations, REDDA module 40 sets the radiation pattern of the beamformed signal 38 based on information gleaned from the IoT system. REDDA system 36 can thus set a radiation pattern for beamformed signal 38 and/or QoS for beamformed signal 38 based on data mining results from wireless network system 12 and/or based on IoT requests.

Figure 6:
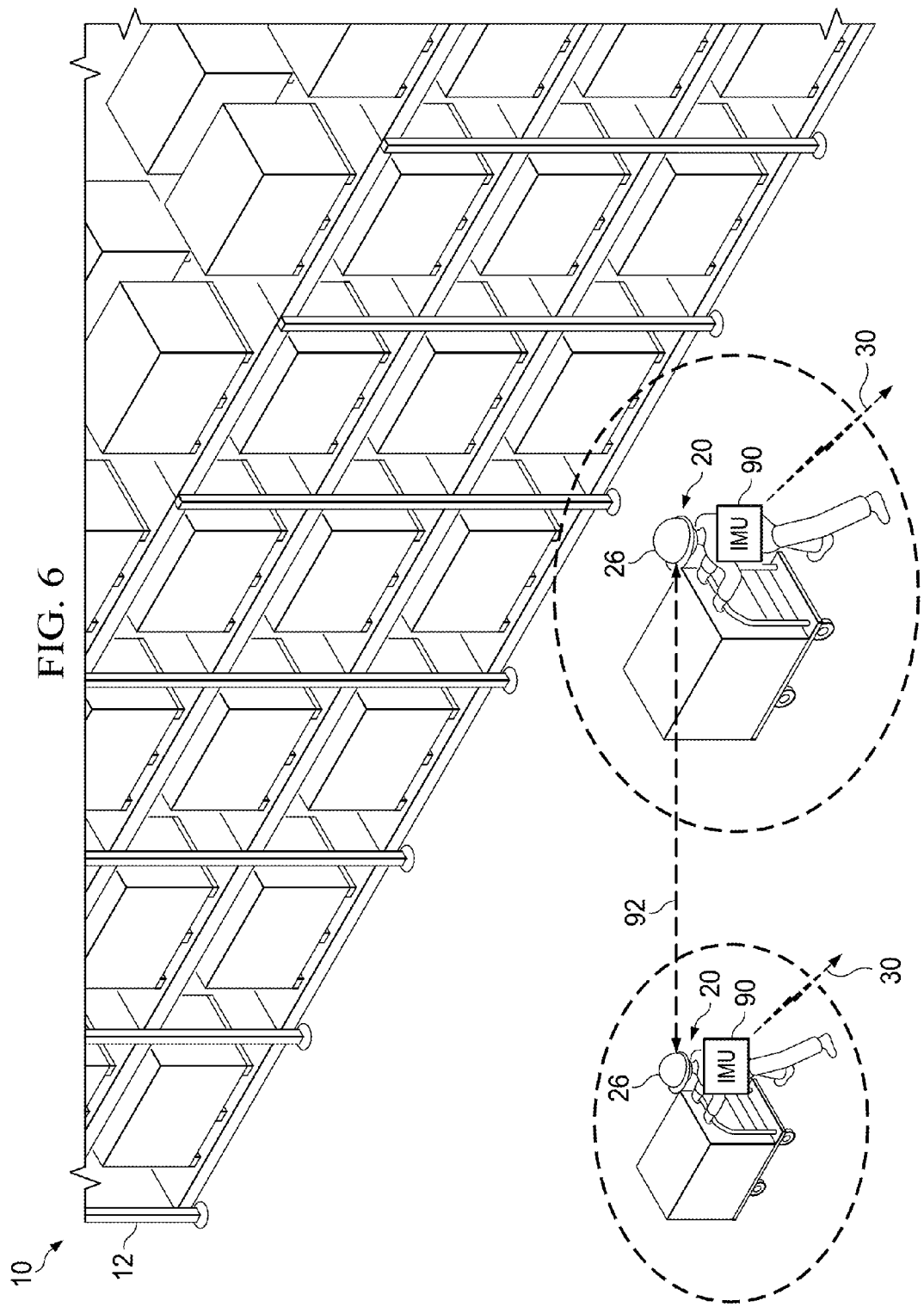
FIG. 6 is a schematic diagram of an exemplary communication system that provides location awareness to a gateway node for transmitting wireless power, such as the gateway node illustrated in FIGS. 2A-2C, according to various aspects of the present disclosure.

In various embodiments, wireless network system 12 can represent a global positioning system (GPS) denied network environment. REDDA module 40 can be configured to have location awareness in the GPS defined environment, such that controller 50 can have location awareness for determining radiation patterns for beamformed signal 38 that maximize wireless power transmission, and then use location awareness to update beamformer sector profile table 64. REDDA module 40 can thus use location awareness to maximize wireless power transmission in various sectors of wireless network system 12 and/or sectors of coverage area of gateway node 22. FIG. 6 is a schematic diagram of an exemplary communication system 10 that provides location awareness to REDDA module 40 according to various aspects of the present disclosure. In FIG. 6, sensor nodes 20 include robots 26, where each robot 26 has an associated inertial measurement unit (IMU) 90. IMUs 90 can generally include embedded instrumentation, such as gyroscopes, 3D accelerometers, 3D gyroscopes, velocity meters, and/or or other inertial sensors, for determining positional data, such as altitude, location, motion, and/or other positional parameter, which can be used to determine a current position of its associated sensor node 20. In various embodiments, each sensor (for example, sensor 28) of sensor nodes 20 can include an IMU 90 for providing positional data associated with the sensor. In various embodiments, IMUs 90 communicate positional data to REDDA system 36 via data signals 30. Alternatively, in various embodiments, IMUs 90 communicate positional data to network element 82 and/or network element 84, where REDDA system 36 receives the positional data information from network element 82 and/or network element 84. Using the positional data associated with sensor nodes 20, REDDA module 40 can update beamformer sector profile table 64 to ensure optimal wireless power transfer (optimal wireless charging) to sensor nodes 20 of wireless network system 12. In various embodiments, based on positional data, REDDA module 40 can adjust a radiation pattern of beamformed signal 38 to maximize RF energy transfer to a given area, thus maximizing charging and/or powering on/off of sensor nodes 20 within the given area. In various embodiments, robots 26 wirelessly communicate with one another in wireless network system 12 via communication signals 92, for example, over a robot communications network. REDDA module 40 can adjust a radiation pattern of beamformed signal 38 by gleaning information from the robot communications network. In various embodiments, robots 26 communicate with one another to optimize positional data information, such that REDDA module 40 can glean information from the collective wisdom of robots 26 to determine beam profiles for beamformer sector profile table 64. In various embodiments, gateway node 22 is configured to update beamformer sector profile table 64 based on collective wisdom between robots 26. In an example, each robot 26 can include gateway node 22 and/or REDDA system 36, where REDDA system 36 collects data from its associated robot 26 and wirelessly powers sensors 28 of its associated robot 26. By reading sensors 28 (in some embodiments, RFID tags of its associated robot 26), REDDA system 36 can enable its associated robot 26 to navigate within and/or around wireless network system 12, particularly useful when wireless network system 12 is configured as a GPS denied environment. In some embodiments, REDDA system 36 can use collective wisdom of robots 26 to navigate within and/or around wireless network system 12. In some embodiments, REDDA system 36 can use collective wisdom of robots 26 to optimize its associated beamformer sector profile table 64. The present disclosure thus contemplates situations where gateway node 22 and/or REDDA system 36 are static or dynamic within and/or around wireless network system 12. FIG. 6 has been simplified for the sake of clarity to better understand the inventive concepts of the present disclosure. Additional features can be added, and some of the features described can be replaced or eliminated in other embodiments.

Figure 7A:
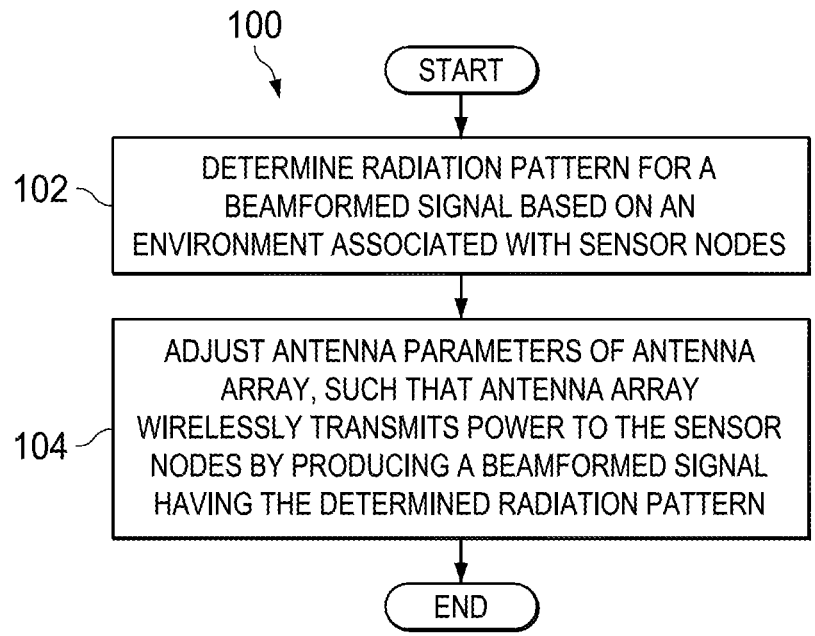
FIG. 7A and FIG. 7B are simplified flowcharts of exemplary wireless power transmission methods that can be implemented by a gateway node to wirelessly charge sensor nodes, such as the gateway node illustrated in FIGS. 2A-2C, according to various aspects of the present disclosure.

FIG. 7A is a simplified flowchart of an exemplary method 100 for wirelessly transmitting power that can be implemented by a gateway node to wirelessly charge sensor nodes, such as gateway node 22 to wirelessly charge sensor nodes 20, according to various aspects of the present disclosure. At block 102, a radiation pattern is determined for a beamformed signal based on an environment associated with sensor nodes. For example, gateway node 22 can evaluate an environment associated with sensor nodes 20 to determine a radiation patter form a beamformed signal transmitted to sensor nodes 20. At block 104, antenna parameters of an antenna array are adjusted, such that the antenna array wirelessly transmits power to the sensor nodes by producing a beamformed signal having the determined radiation pattern. For example, gateway node 22 adjusts antenna parameters (for example, using controller 50) of antenna array 42 to achieve the determined radiation pattern for beamformed signal 38. Gateway node 22 can optimize wireless power transmission to sensor nodes 20 by producing beamformed signal 38 having the determined radiation pattern. Additional steps can be provided before, during, and after method 100 and some of the steps described can be replaced or eliminated for other embodiments of method 100.

Figure 7B:
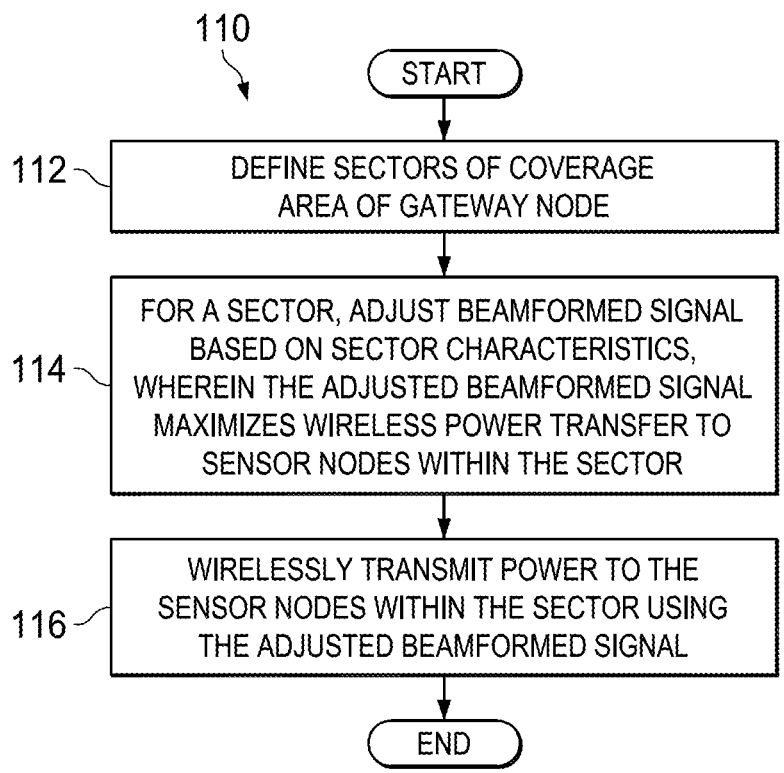

FIG. 7B is a simplified flowchart of another exemplary method 110 for wirelessly transmitting power that can be implemented by a gateway node to wirelessly charge sensor nodes, such as gateway node 22 to wirelessly charge sensor nodes 20, according to various aspects of the present disclosure. At block 112, sectors of a coverage area of a gateway node are defined. For example, gateway node 22 can define various sectors of coverage area A. At block 114, for a sector, a beamformed signal is adjusted based on sector characteristics, such that the adjusted beamformed signal maximizes wireless power transfer to sensor nodes within the sector. For example, gateway node 22 can evaluate an environment associated with the sector, including number and/or location of sensor nodes 20 within the sector, and then adjust beamformed signal 38 transmitted to the sector based on the environment. At block 116, wireless power is transmitted to the sensor nodes within the sector using the adjusted beamformed signal. For example, gateway node 22 can adjust a radiation pattern of beamformed signal 38 delivered to the sector, where the adjusted radiation pattern maximizes wireless power transmission to sensor nodes 20 within the sector. Additional steps can be provided before, during, and after method 110 and some of the steps described can be replaced or eliminated for other embodiments of method 110.

In various implementations, components of the FIGURES can be implemented on a board of an associated electronic device. The board can be a general circuit board that can hold various components of an internal electronic system of the electronic device and, further, provide connectors for other peripherals. The board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, other considerations, or a combination thereof. Other components, such as external storage, sensors, controllers for audio/video display, and peripheral devices may be attached to the board as plug-in cards, via cables, or integrated into the board itself. In various implementations, components of the FIGURES can be implemented as stand-alone modules (for example, a device with associated components and circuitry configured to perform a specific application or function) or implemented as plug-in modules into application specific hardware of electronic devices. Note that particular embodiments of the present disclosure may be readily included in a system-on-chip (SOC) package, either in part, or in whole. An SOC represents an integrated circuit that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the various functions described herein may be implemented in one or more semiconductor cores (such as silicon cores) in application specific integrated circuits (ASICs), field programmable gate arrays (FPGAs), other semiconductor chips, or combinations thereof.

The various functions outlined herein may be implemented by logic encoded in one or more non-transitory and/or tangible media (for example, embedded logic provided in an application specific integrated circuit (ASIC), as digital signal processor (DSP) instructions, software (potentially inclusive of object code and source code) to be executed by a processor, or other similar machine, etc.). In some of these instances, a memory element can store data used for the operations described herein. This includes the memory element being able to store logic (for example, software, code, processor instructions) that is executed by a processor to carry out the activities described herein. The processor can execute any type of instructions associated with the data to achieve the operations detailed herein. In various implementations, the processor can transform an element or an article (such as data) from one state or thing to another state or thing. In another example, the activities outlined herein may be implemented with fixed logic or programmable logic (such as software/computer instructions executed by the processor) and the elements identified herein can be some type of a programmable processor (such as a DSP), programmable digital logic (e.g., a FPGA, an erasable programmable read only memory (EPROM), an electrically erasable programmable ROM (EEPROM)), or an ASIC that includes digital logic, software, code, electronic instructions, or any suitable combination thereof.

Note that the activities discussed above with reference to the FIGURES are applicable to any integrated circuits that involve signal processing, particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be a part of smartphones, tablets, security systems, PCs, gaming technologies, virtual reality, simulation training, etc.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than a restrictive sense.

Note that with the numerous examples provided herein, interaction may be described in terms of two, three, four, or more processing components. However, this has been done for purposes of clarity and example only. It should be appreciated that the system can be consolidated in any suitable manner. Along similar design alternatives, any of the illustrated components, modules, circuits, and elements of the FIGURES may be combined in various possible configurations, all of which are clearly within the broad scope of this Specification. In certain cases, it may be easier to describe one or more of the functionalities of a given set of flows by only referencing a limited number of processing components. It should be appreciated that the processing components of the FIGURES and its teachings are readily scalable and can accommodate a large number of components, as well as more complicated/sophisticated arrangements and configurations. Accordingly, the examples provided should not limit the scope or inhibit the broad teachings of the processing system and/or components as potentially applied to a myriad of other architectures.

Further, note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. It is further noted that "coupled to" and "coupled with" are used interchangeably herein, and that references to a feature "coupled to" or "coupled with" another feature include any communicative coupling means, electrical coupling means, mechanical coupling means, other coupling means, or a combination thereof that facilitates the feature functionalities and operations, such as the security check mechanisms, described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

In various implementations, a system is provided. The system can include means for wirelessly transmitting power to sensor nodes within a coverage area using a beamformed RF signal, and adjusting the beamformed signal to maximize wireless power transfer to sensor nodes within each sector of the coverage area. The system can further include means for aggregating data from the sensor nodes. The 'means for' in these instances can include (but is not limited to) using any suitable component discussed herein, along with any suitable software, circuitry, hub, computer code, logic, algorithms, hardware, controller, interface, link, bus, communication pathway, etc. In various implementations, the system includes memory that includes instructions that when executed cause the system to perform any of the activities discussed herein.

What is claimed is:

1. A wireless charging network system that includes wirelessly charged sensor nodes, the wireless charging network system comprising: a gateway node configured to evaluate an environment associated with the sensor nodes and to aggregate data from sensor nodes comprising location of within a coverage area of the gateway node and wirelessly transmit power to the sensor nodes using a beamformed signal, wherein the gateway node includes a programmable beamformer sector profile table that stores and defines adaptive beam profiles for the beamformed signal for each sector of the coverage area based upon the evaluation of the environment for each sector and selects and adjusts the beamformed signal to maximize wireless power transfer to the sensor nodes within each sector of the coverage area.

2. The wireless charging network system of claim 1, wherein the gateway node is configured to use the location information in defining the adaptive beam profiles.

3. The wireless charging network system of claim 2 configured as a global positioning system (GPS) denied environment.

4. The wireless charging network system of claim 2, wherein the sensor nodes include inertial measurement units (IMUs), and the gateway node is configured to receive the location information from the IMUs.

5. The wireless charging network system of claim 2, wherein the gateway node includes an Internet of Things (IoT) interface connected to an IoT network, wherein the gateway node is configured to receive the location information over the IoT network via the IoT interface.

6. The wireless charging network system of claim 5, wherein the sensor nodes include inertial measurement units (IMUs), and the gateway node receives the location information from a network element over the IoT network, wherein the network element includes knowledge of positional data obtained by the IMUs.

7. The wireless charging network system of claim 5, wherein the sensor nodes include robots that have inertial measurement units (IMUs), and the gateway node receives the location information from a robot communications network via IoT connectivity.

8. The wireless charging network system of claim 2, wherein the sensor nodes include robots that have inertial measurement units (IMUs), and the gateway node is configured to receive the location information from a robot communications network.

9. The wireless charging network system of claim 8. wherein the gateway node is configured to update the beamformer sector profile table based on communications between robots.

10. The wireless charging network system of claim 9, wherein the gateway node is configured to update the beamformer sector profile table based on collective wisdom between robots.

11. The wireless charging network system of claim 1 configured as a radio frequency identification (RFID) system, wherein the gateway node is an RFD reader and the sensor nodes include RFID tags.

12. A method performed by a gateway node to wirelessly charge sensor nodes within a coverage area of the gateway node using a beamformed signal, the method comprising: defining sectors of the coverage area of the gateway node; receiving location information of the sensor nodes at the gateway node; storing a beamformer sector profile table that defines beam profiles for a plurality of environments; evaluating an environment associated with sensor nodes for each of the sectors; for each sector, selecting a beam profile and adjusting the beamformed signal based on the evaluation of the environment and location information, wherein the adjusted beamformed signal maximizes wireless power transfer to the sensor nodes within each sector; and wirelessly transmitting power to the sensor nodes within each sector using the adjusted beamformed signal.

13. The method of claim 12, further including defining a beam profile associated with each sector, wherein the beam profile defines a radiation pattern for the beamformed signal based on sector characteristics, wherein the beamformed signal is adjusted according to the beam profile associated with the sector.

14. The method of claim 13, further comprising defining the beam profiles using the location information.

15. The method of claim 14, further including obtaining the location information from are IoT network.

16. The method of claim 13, further including defining the beam profile based on a defined quality of service.

17. A wireless charging platform for a wireless sensor network, the wireless charging platform comprising: a radio frequency energy distributor and data aggregator (REDDA) system that includes an Internet of Things (IoT) interface connected to an IoT network and a transceiver, wherein the REDDA system is configured to aggregate data wirelessly transmitted from sensor nodes within a coverage area of the REDDA system, evaluate an environment associated with the sensor nodes, and wirelessly transmit power to the sensor nodes using a beamformed RF signal, both the wirelessly transmitted aggregated data and wirelessly transmitted power are in different bands of the transceiver; wherein the REDDA system adjusts the beamformed RF signal to maximize wireless power transfer to sensor nodes within each sector of the coverage area, based upon the evaluation of the environment in which the sensor nodes are disposed.

18. The wireless charging platform of claim 17, wherein the REDDA system includes a beamformer sector profile table that defines beam profiles for the beamformed signal for each sector of the coverage area, wherein the REDDA system is configured to receive location information for use in defining the beam profiles.

19. The wireless charging platform of claim 18, wherein the REDDA system is configured to receive the location information from the IoT network.

* * * * *